(12) United States Patent
Haverkamp et al.

(10) Patent No.: US 9,262,625 B2
(45) Date of Patent: *Feb. 16, 2016

(54) ADDRESS TRANSLATION/SPECIFICATION FIELD FOR HARDWARE ACCELERATOR

(71) Applicant: International Business Machines Corporation, Armonk, NY (US)

(72) Inventors: Frank Haverkamp, Tuebinger (DE); Christian Jacobi, Poughkeepsie, NY (US); Scot H. Rider, Pleasant Valley, NY (US); Vikramjit Sethi, Austin, TX (US); Randal C. Swanberg, Round Rock, TX (US); Joerg-Stephan Vogt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,524

(22) Filed: Sep. 30, 2014

(65) Prior Publication Data

US 2015/0020192 A1    Jan. 15, 2015

Related U.S. Application Data

(63) Continuation of application No. 13/922,304, filed on Jun. 20, 2013.

(51) Int. Cl.
| | |
|---|---|
| G06F 21/51 | (2013.01) |
| G06F 9/48 | (2006.01) |
| G06F 9/54 | (2006.01) |
| G06F 21/74 | (2013.01) |
| G06F 21/79 | (2013.01) |

(52) U.S. Cl.
CPC .............. *G06F 21/51* (2013.01); *G06F 9/4881* (2013.01); *G06F 9/545* (2013.01); *G06F 21/74* (2013.01); *G06F 21/79* (2013.01)

(58) Field of Classification Search
CPC ........ G06F 9/4881; G06F 9/545; G06F 21/51; G06F 21/79; G06F 21/74
USPC ................................................... 711/E12.091
See application file for complete search history.

(56) References Cited

U.S. PATENT DOCUMENTS

| | | | |
|---|---|---|---|
| 6,243,789 B1 * | 6/2001 | Hasbun et al. | 711/103 |
| 8,185,783 B2 | 5/2012 | Lee et al. | |
| 2007/0285271 A1 * | 12/2007 | Erlingsson et al. | 340/815.84 |
| 2010/0107249 A1 * | 4/2010 | Krig | 726/22 |
| 2013/0141448 A1 * | 6/2013 | Yokota et al. | 345/522 |

* cited by examiner

*Primary Examiner* — Xiao Wu
*Assistant Examiner* — Chong Wu
(74) *Attorney, Agent, or Firm* — Cantor Colburn LLP; Margaret McNamara

(57) ABSTRACT

Embodiments relate an address translation/specification (ATS) field. An aspect includes receiving a work queue entry from a work queue in a main memory by a hardware accelerator, the work queue entry corresponding to an operation of the hardware accelerator that is requested by user-space software, the work queue entry comprising a first ATS field that describes a structure of the work queue entry. Another aspect includes, based on determining that the first ATS field is consistent with the operation corresponding to the work queue entry and the structure of the work queue entry, executing the operation corresponding to the work queue entry by the hardware accelerator. Another aspect includes, based on determining that the first ATS field is not consistent with the operation corresponding to the work queue entry and the structure of the work queue entry, rejecting the work queue entry by the hardware accelerator.

20 Claims, 8 Drawing Sheets

ADDRESS TRANSLATION/SPECIFICATION FIELD FOR HARDWARE ACCELERATOR

CROSS-REFERENCE TO RELATED APPLICATION

This application is a continuation of U.S. application Ser. No. 13/922,304 (Haverkamp et al.), filed on Jun. 20, 2013, which is herein incorporated by reference in its entirety.

BACKGROUND

The present invention relates generally to computing systems, and more specifically, to an address translation/specification (ATS) field for a hardware accelerator in a computing system.

A computing system may include a hardware accelerator that interacts with user-space software in the computing system via a trusted operating system (OS)-level driver. The user-space software may send control blocks corresponding to operation requests to the hardware accelerator via the trusted OS level driver, which translates the control blocks into work queue entries that are dequeued by the hardware accelerator for processing. Poorly written or malicious user-space software has the potential to cause the hardware accelerator to initiate memory accesses that crash the computing system. A trusted OS-level driver protects against such memory accesses, as the work queue entries that are received by the hardware accelerator are constructed to have a specific format by the trusted OS-level driver; therefore, the only work queue entries in the specific format are sent to the hardware accelerator. However, architectures may vary among hardware accelerators, and each architecture may require an OS-level driver that is specific to both the OS that is running on the computing system and to the hardware accelerator. Further, each hardware accelerator in a particular computing system may require a dedicated OS-level driver.

SUMMARY

Embodiments include a method and computer program product for an address translation/specification (ATS) field for a hardware accelerator. An aspect includes receiving a work queue entry from a work queue in a main memory by the hardware accelerator, the work queue entry corresponding to an operation of the hardware accelerator that is requested by user-space software executed by a processor that is communicatively coupled to the hardware accelerator, the work queue entry comprising a first ATS field that describes a structure of the work queue entry. Another aspect includes determining, by the hardware accelerator, whether the first ATS field is consistent with the operation corresponding to the work queue entry and the structure of the work queue entry. Another aspect includes, based on determining that the first ATS field is consistent with the operation corresponding to the work queue entry and the structure of the work queue entry, executing the operation corresponding to the work queue entry by the hardware accelerator. Another aspect includes, based on determining that the first ATS field is not consistent with the operation corresponding to the work queue entry and the structure of the work queue entry, rejecting the work queue entry by the hardware accelerator.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
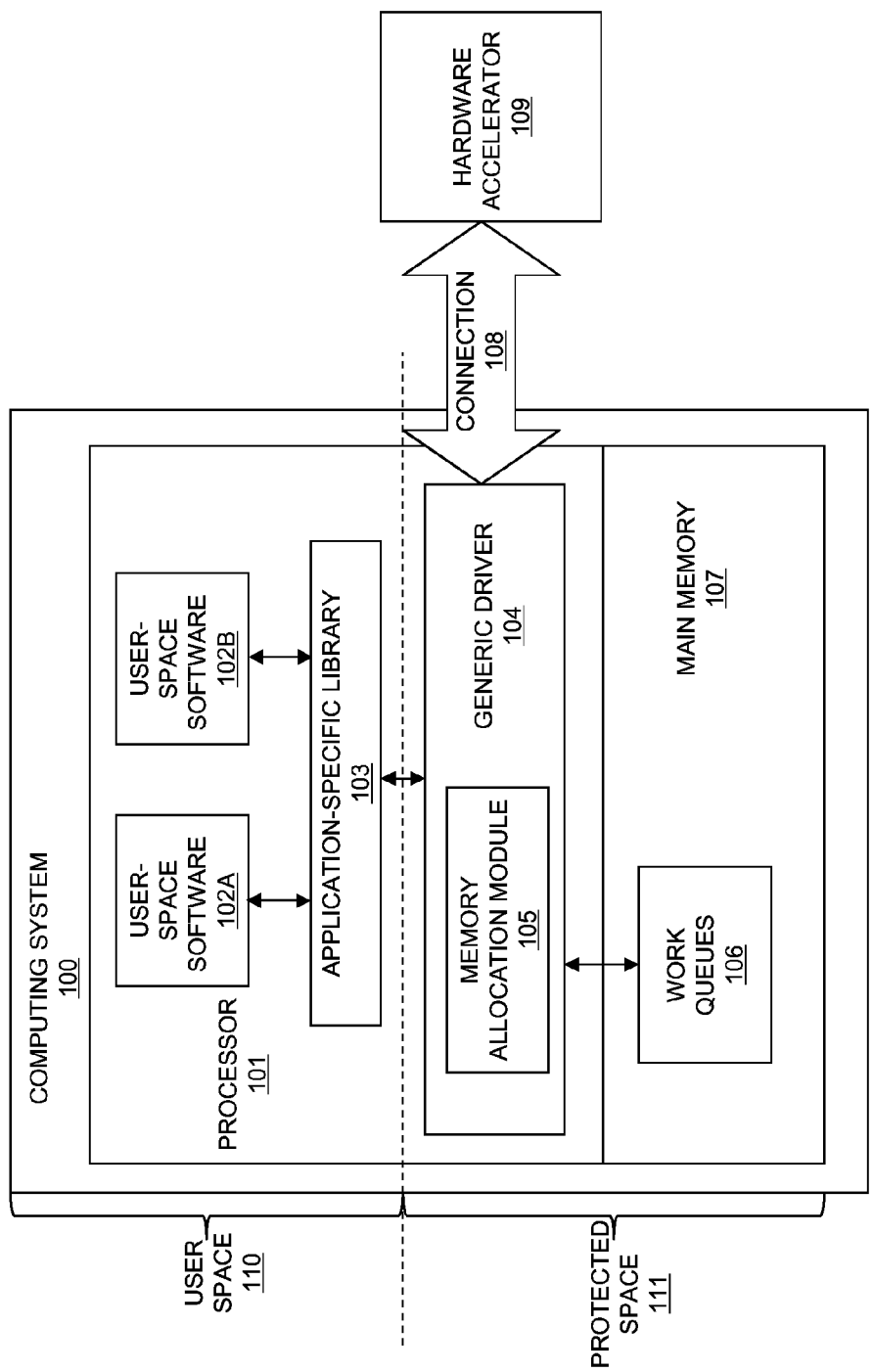
FIG. 1 depicts a block diagram of a computing system for use in conjunction with an ATS field for a hardware accelerator in accordance with an embodiment.

An ATS field for a hardware accelerator in a computing system is provided, with exemplary embodiments being discussed in detail. The ATS field in conjunction with a generic driver allows user-space software on a computing system to control memory allocation for a hardware accelerator such that the memory allocation is optimized for the particular host architecture and OS of the computing system. Verification of the integrity of the work queue entries that are received by the hardware accelerator is also performed using the ATS field, preventing raw data from being misconstrued by the hardware accelerator as memory references. This prevents memory protection violations by the hardware accelerator, and protects against malicious user-space software behavior. The memory allocation technique that is used may also be verified using the same ATS field to determine whether it is expected and/or supported by the hardware accelerator; and, if not, the lack of support may be detected before causing higher-level system failure.

The hardware accelerator comprises computer hardware that accelerates some aspect or functionality of a software application that is executing on a computing system. For example, in various embodiments, the hardware accelerator may comprise a field programmable gate array (FPGA) logic, a networking processor, or a graphics engine. In further embodiments, the hardware accelerator may comprise any device that is attached to a computing system, such as a printer, processor, or storage device.

The OS-level driver is separated into two parts: an application-specific library and the generic driver. The application-specific library may be invoked, or called, by user-space software in order to access functions of the hardware accelerator via the generic driver. The application-specific library comprises a user-space library that understands the command architecture for interfacing with the hardware accelerator. The application-specific library translates the application's request into hardware accelerator command, or control block, and creates the ATS field to describe to the generic driver where to find the addresses that needing to be verified, mapped, and authorized for the hardware accelerator function to be performed. The generic driver is specific to the OS of the computing system, and performs allocation of physical memory for operations, such as reads or writes from main memory, in the computing system. The generic driver is a kernel level driver that understands the command architecture for interfacing to the hardware accelerator, but not the application-specific portion of the command. The generic driver performs memory allocation, including, but not limited to, address translation and page pinning, and creates work queue entries for processing by the hardware accelerator, based on the control blocks. The generic driver uses the ATS field to find, map, and authorize memory address pointers inside of opaque data structures that are otherwise not visible to the generic driver. The hardware accelerator may only consume memory addresses from the control block as identified by the ATS field.

Both the control blocks and the work queue entries include respective ATS fields that describe what type of memory structure is used within the control block or work queue entry. An ATS field may also define an access mode for said memory (e.g., read-only, or read/write) for the operation. The ATS field may provide a mechanism for the generic driver to substitute a memory reference in a control block with an equivalent representation of a memory reference in the work queue entry that is more suitable to the computing system's architecture; for example, replacing a flat address reference with a scatter gather list. The hardware accelerator may expect specific ATS field values to be in specific positions in the work queue entry for a given operation to be executed on that hardware accelerator; mismatch between the ATS field and the rest of the work queue entry may result in rejection the work queue entry by the hardware accelerator, using, for example, a predefined system return code for safe handling. Together, the application-specific library and the generic driver enable new hardware accelerators and user software that uses the hardware accelerator to be developed completely in user-space, without needing to develop new kernel drivers for each new hardware accelerator.

The work queue management and memory allocation function are performed by the generic driver such that the memory allocation requests in the control blocks from the user-space software are translated into a memory structure that is appropriate for the particular architecture of the computing system. For example, if the OS of the computing system can only allocate memory in contiguous in 4KB blocks, the generic driver for that OS may implement a request for a contiguous block of memory as a scatter gather list of 4KB pages, whereas a generic driver for another OS that can allocate contiguous memory blocks large enough to accommodate the entire memory allocation request may allocate a single flat address pointer.

FIG. 1 illustrates an embodiment of a computing system 100 for use in conjunction with an ATS field for hardware accelerator 109. Computing system 100 includes a processor 101 and a main memory 107, and hosts one or more instances of user-space software, such as user-space software 102A-B. Computing system 100 includes a user space 110, which includes user-space software 102A-B and application-specific library 103 which run on processor 101, and protected space 111, which includes generic driver 104 and memory allocation module 105 that run on processor 101, and also main memory 107. User-space software 102A-B interacts with application-specific library 103 in order to request operations to be performed by hardware accelerator 109. The application-specific library 103 issues control blocks to generic driver 104 for the operations to be performed by hardware accelerator 109. In some embodiments, the hardware accelerator 109 may be, for example, a customized field programmable gate array (FPGA) logic, a networking processor, or a graphics engine. In further embodiments, the hardware accelerator 109 may comprise any type of device that may be attached to computing system 100 via connection 108, such as a printer, processor, or storage device. The generic driver 104 maintains work queues 106, which holds work queue entries that are generated by generic driver 104 based on the control blocks received from application-specific library 103, in main memory 107. The work queue entries in work queues 106 are processed by hardware accelerator 109 via connection 108, which may include, for example, a network and/or input/output (I/O) interface (e.g., peripheral component interconnect (PCI) express), in order to perform operations that were requested via the control blocks sent from application-specific library 103 to generic driver 104. The generic driver 104 facilitates passing memory allocation requests between the application-specific library 103 and the hardware accelerator 109. FIG. 1 is shown for illustrative purposes only; for example, the generic driver 104 and application-specific library 103 may be used by any appropriate number and type of instances of user-space software, such as user space software 102A-B, to communicate with any appropriate number and type of hardware accelerators, such as hardware accelerator 109.

An ATS field is included in both the control blocks received by generic driver 104 from application-specific library 103, and in the work queue entries in the work queues 106. Through the ATS field, the application-specific library 103 marks what sections of a control block include a pointer to a memory location, a length, other memory allocation descriptions, or unstructured data. The application-specific library 103 indicates what type of memory allocation is required via virtual memory addresses in the control block. The memory allocation module 105 in generic driver 104 performs memory allocation for the operation requested by the control block. The memory allocation module 105 may perform address translations from virtual to real memory addresses; the memory allocation that is performed may depend on the OS and architecture of the computing system 100. In some embodiments, hardware accelerator 109 may support, for example, having a flat address replaced by a scatter gather list by memory allocation module 105. However, certain substitutions may not be permitted in some computing systems, for example, a flat address may not replace a scatter gather list. The generic driver 104 constructs a work queue entry including the ATS field based on the memory allocation and the rest of the control block, and stores the work queue entry including the ATS field in work queues 106. The generic driver 104 may change the ATS field in the work queue entry based on the memory allocation. When the hardware accelerator 109 dequeues a work queue entry from work queues 106 for processing, the hardware accelerator 109 expects specific description types to be in specific locations in a work queue entry for a given operation to be executed on the hardware accelerator 109. When a work queue entry from work queues 106 is processed by the hardware accelerator 109, the ATS field information in the work queue entry directs the hardware accelerator 109 to utilize data structures in main memory 107 suitable for the OS and architecture of computing system 100. If the ATS field in a work queue entry is inconsistent with the operation requested by the work queue entry or with the structure of the work queue entry, the hardware accelerator 109 may reject the work queue entry. The hardware accelerator 109 may also reject to operate on a control block if it detects that the ATS field that describes the memory pointer that the hardware accelerator 109 is trying to write to is designated as read only, or in violation of a memory access mode that is defined by the ATS encoding.

Figure 2:
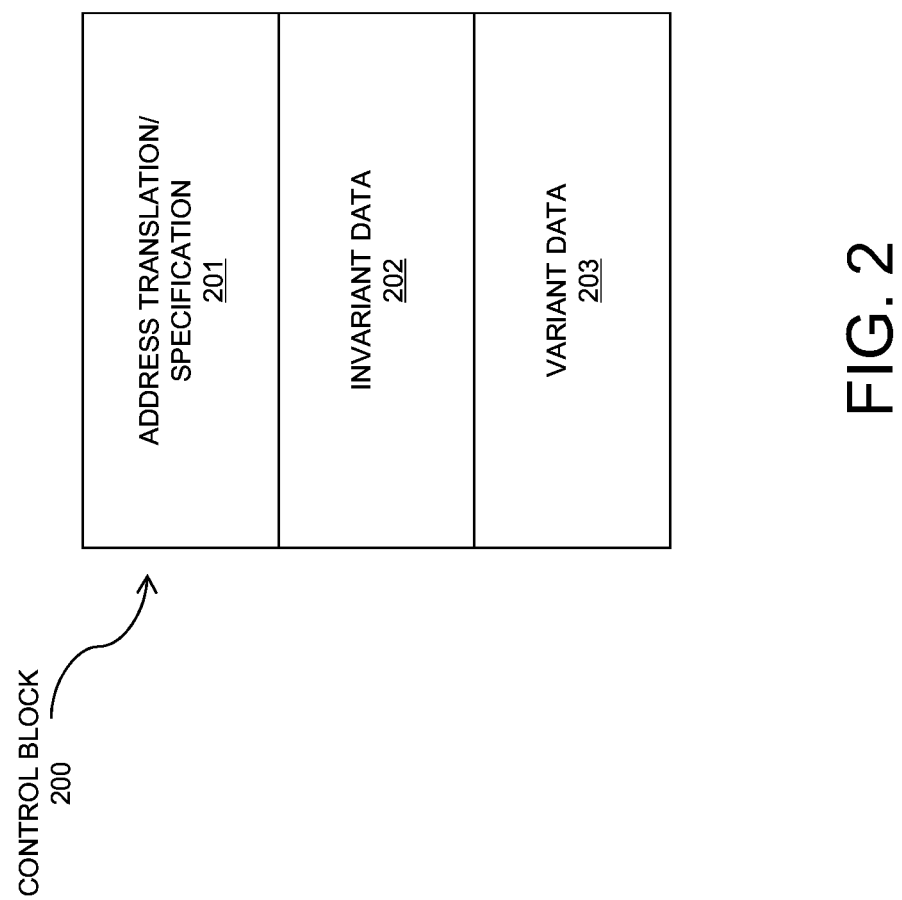
FIG. 2 depicts a block diagram of a control block including an ATS field in accordance with an embodiment.

FIG. 2 illustrates an embodiment of a control block 200. The control block 200 may issued by application-specific library 103 to generic driver 104. The control block 200 corresponds to an operation that is requested by application-specific library 103 to be performed by hardware accelerator 109, and includes ATS field 201, invariant data 202, and variant data 203. Invariant data 202 is data the application-specific library 103 provides to the hardware accelerator 109. Variant data 203 is data the hardware accelerator 109 may optionally present back to the application-specific library 103. The ATS field 201 may include a plurality of encoded values that specify the type of data that is located in respective predefined sections of the control block 200, for example, in invariant data 202. In some embodiments, the invariant data 202 may comprise virtual memory addresses that are needed for completion of the operation corresponding to control block 200.

Figure 3:
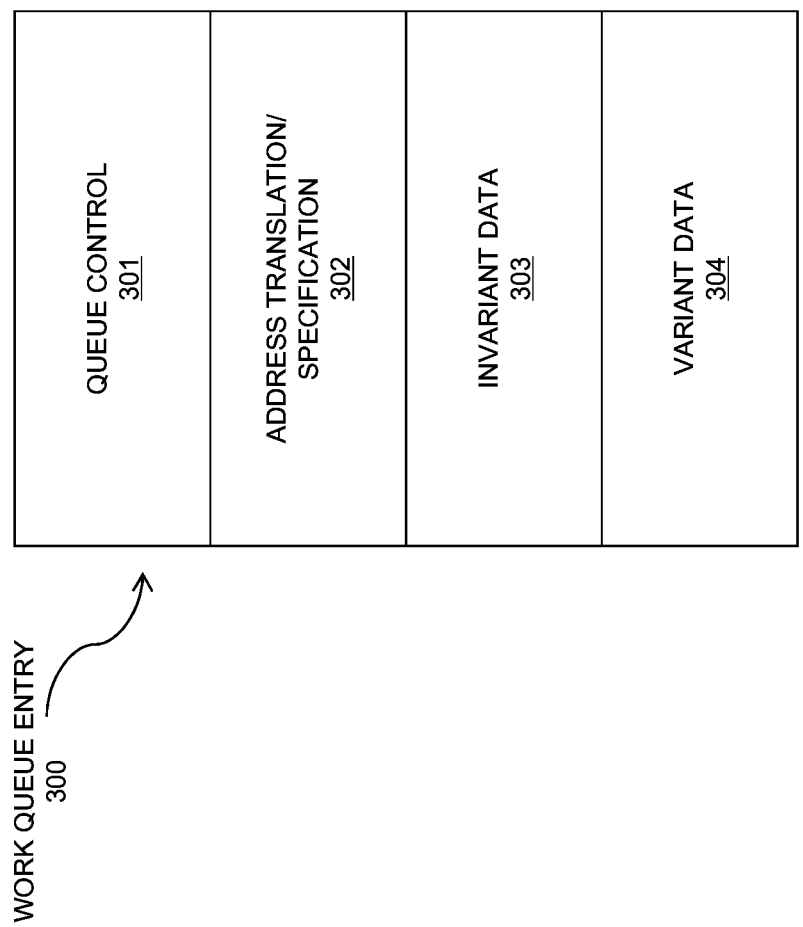
FIG. 3 depicts a block diagram of a work queue entry including an ATS field in accordance with an embodiment.

FIG. 3 illustrates an embodiment of a work queue entry 300. The work queue entry 300 may be stored in work queues 106 of FIG. 1, and may be constructed by the generic driver 104 and memory allocation module 105 based on a control block, such as control block 200 of FIG. 2, that is received from application-specific library 103. The work queue entry 300 corresponds to an operation that is requested by application-specific library 103 to be performed by hardware accelerator 109, and includes queue control field 301, which indicates control information for processing the work queue entry 300 (e.g., opcodes, sequence numbers, or other control information not related to memory allocation). The work queue entry 300 further includes ATS field 302, invariant data 303, and variant data 304. Invariant data 303 is data the application-specific library 103 provides to the hardware accelerator 109. Variant data 304 is data the hardware accelerator 109 may optionally present back to the application-specific library 103. The ATS field 302 may include a plurality of encoded values that specify the type of data that is located in respective predefined sections of a work queue entry, for example, in invariant data 303. In some embodiments, the invariant data 303 may comprise real memory addresses in main memory 107 that are needed for completion of the operation corresponding to work queue entry 300; the real memory addresses in invariant data 303 may be generated by memory allocation module 105 by translating virtual memory addresses located in the invariant data 202 of a control block 200. ATS field 302 in the work queue entry 300 may differ from the ATS field 201 in the control block 200 based on the type of memory allocation was performed by memory allocation module 105. In some embodiments, the data in invariant data 303 may be a pointer to another work queue entry in main memory 107, referred to as a child block, that holds additional data and/or memory addresses that are needed to complete the operation corresponding to work queue entry 300; this may be indicated by the portion of the ATS field 302 associated with the pointer's location in the work queue entry.

Figure 4:
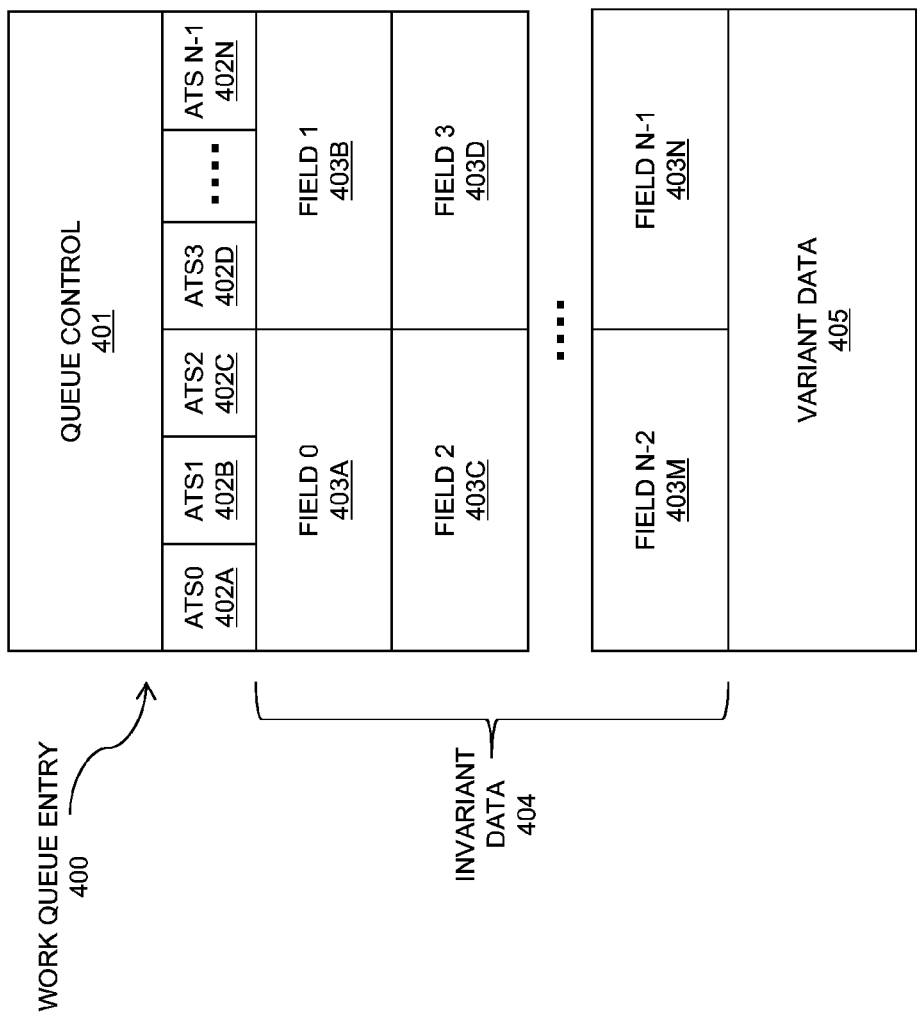
FIG. 4 depicts a detailed view of a work queue entry including an ATS field in accordance with an embodiment.

In some embodiments, an ATS field may comprise a plurality of ATS fields that refer to separate data sections of a work queue entry; such an embodiment is illustrated with respect to work queue entry 400 of FIG. 4. Work queue entry 400 includes queue control 401, ATS subfields 402A-N, invariant data 404, and variant data 405. In FIG. 4, the invariant data 404 is broken into equally sized (K bytes each) fields 403A-N, and each field 403A-N is associated with a respective ATS subfield 402A-N that describes the data held in the particular field 403A-N. ATS0 402A describes the first K bytes of invariant data 404 that are located in field0 403A, and ATS(n−1) describes the last K bytes of invariant data 404 in field(n−1) 403N. If hardware accelerator 109 determines that an ATS field, such as ATS 0 402A, does not match the data in its respective field, such as field0 403A, or determines that any portion of the ATS field 402A-N, such as ATS 0 402A, does not match the operation requested by work queue entry 400, the work queue entry may be rejected by the hardware accelerator 109. FIG. 4 is shown for illustrative purposes only; for example, the fields in invariant data 404 may be different sizes in some embodiments.

Figure 5:
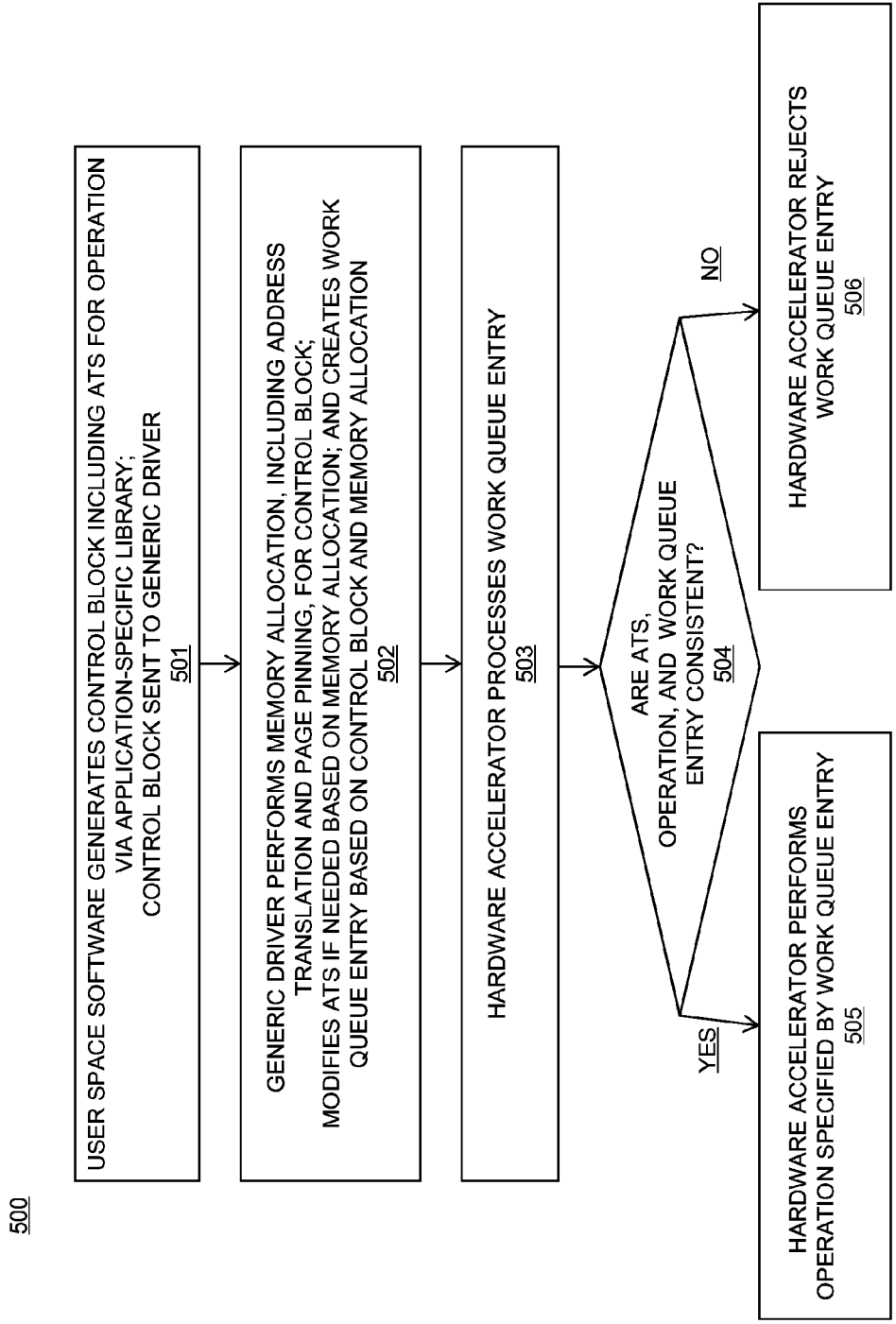
FIG. 5 depicts a process flow for use of an ATS field for a hardware accelerator in accordance with an embodiment.

FIG. 5 illustrates an embodiment of a flowchart of a method 500 for use of an ATS field for a hardware accelerator. FIG. 5 is discussed with respect to FIGS. 1-3. First, in block 501, an instance of user-space software, such as user space software 102A-B, issues a control block 200 via a call to application-specific library 103 to the generic driver 104 for request execution of a particular operation of the hardware accelerator 109. The control block 200 may comprise invariant data 202 and an ATS field 201 describing the data in the invariant data 202. Next, in block 502, the generic driver 104, which runs at the OS level in computing system 100, creates a work queue entry 300 in work queues 106 corresponding to the control block 200 that was received in block 501. The memory allocation module 105 translates any virtual addresses in control block 200 into real memory addresses, and the translated real memory addresses are inserted into the work queue entry 300 in invariant data 303. The generic driver 104 also inserts an ATS field 302 into the work queue entry 300; depending on the address translation that was performed, the generic driver may update the information from ATS field 201 as needed and insert a different ATS field 302 into the work queue entry 300. Generic driver 104 also ensures that all real memory addresses specified by the work queue entry 300 are pinned and immutably accessible to the hardware accelerator 109. The ATS field 302 in the work queue entry 300 may indicate whether fields within the work queue entry 300 denote, for example, an addressable flat memory area or scatter-gather memory areas. The work queue entry 300 is then entered into the work queues 106 to wait for processing by the hardware accelerator 109. The pinning ensures that the referenced memory areas in a work queue entry in the work queues 106 cannot be paged out while the work queue entry is waiting. In some embodiments, the data in invariant data 303 in a work queue entry 300 may be a pointer to another work queue entry, referred to as a child block, that holds additional data and/or memory addresses that are needed to complete the operation corresponding to work queue entry 300; this may be indicated by the ATS field 302.

Then, in block 503 of method 500, the work queue entry 300 is dequeued from the work queues 106 by the hardware accelerator 109 for processing. The hardware accelerator 109 has an expectation of what the ATS field 302 should be based on the queue control information 301 and based on the structure of the data that is referred to by the ATS field 302. In block 504, the hardware accelerator 109 determines whether the ATS field 302 is consistent with this expectation. If the ATS field 302 is determined to be consistent, e.g., the ATS field 302 describes mappings that are what the hardware accelerator 109 expects for the specific operation, flow proceeds from block 504 to block 505, and the hardware accelerator 109 executes the operation described by the work queue entry 300 (and, in some embodiments, any child blocks that are associated with the work queue entry 300 by the ATS field 302). However, if the ATS field 302 is determined to be inconsistent in block 504, e.g., the ATS field 302 describes mappings that are not what the hardware accelerator 109 expects for the specific operation, flow proceeds from block 504 to block 506, in which the hardware accelerator 109 rejects the work queue entry 300 without execution of the operation using a bad return code. In some embodiments, any child blocks that are associated with the work queue entry 300 in work queues 106 are also rejected. This enables the hardware accelerator 109 to prevent malicious or poorly written user space programs from accessing the main memory 107 via the hardware accelerator 109.

Table 1 shows example ATS field values, and the type of data that is expected in a field that is associated with each example ATS value. Some embodiments of ATS fields may designate a memory mode (e.g., read only or read/writeable). In the embodiment of Table 1, the ATS fields are 4 bits each; however, this is for illustrative purposes only. In various embodiments of a generic driver, there may be any appropriate number of possible ATS values, each corresponding to a particular designation, and the ATS field may have any appropriate length.

TABLE 1

| ATS VALUE | DATA TYPE |
|---|---|
| 0000 | Raw Data: Reference field is data, not a memory reference |
| 0100 | Flat Address: Reference field is an address of read only memory followed by a length |
| 0101 | Flat Address: Reference field is an address of R/W memory followed by a length |
| 0110 | Scatter Gather: Reference field is an address to a list of address/length pairs to be executed in order, all referring to read only memory |
| 0111 | Scatter Gather: Reference field is an address to a list of address/length pairs to be executed in order, all referring to R/W memory |
| 0010 | Child block: Reference field is another ATS field followed by another application specific invariant field |

Figure 6:
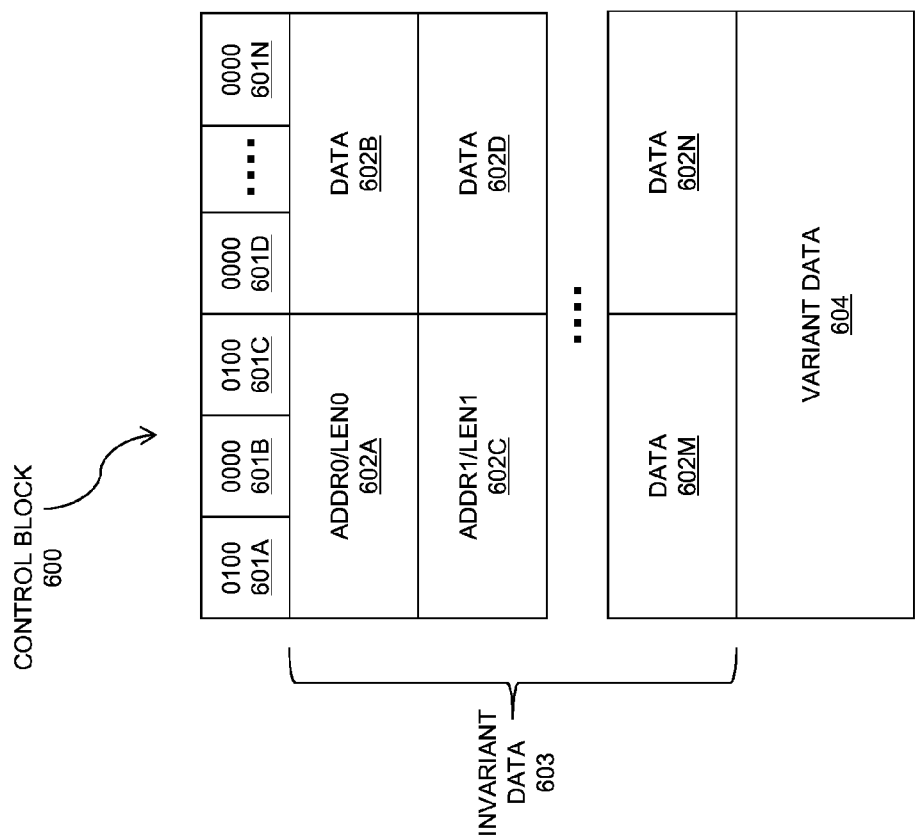
FIG. 6 depicts a block diagram of a control block including an ATS field in accordance with an embodiment.

An example control block 600 is shown in FIG. 6, incorporating the ATS values shown in Table 1. The ATS field 601A-N, in control block 600 comprises "0100_000_0100_0000_0000 . . . 0" indicates invariant data 603 comprising fields 602A-N comprising two flat address pointers addr0 and addr1, each followed by a corresponding length len0 and len1, and raw data fields. For such an ATS field 601A-N, the ATS field immediately following the references for addr0 and addr1 may be ignored since, by definition, the 0100 ATS code in ATS fields 601A and 601C indicates an address followed by a length. Control block 600 further comprises variant data 604.

Figure 7:
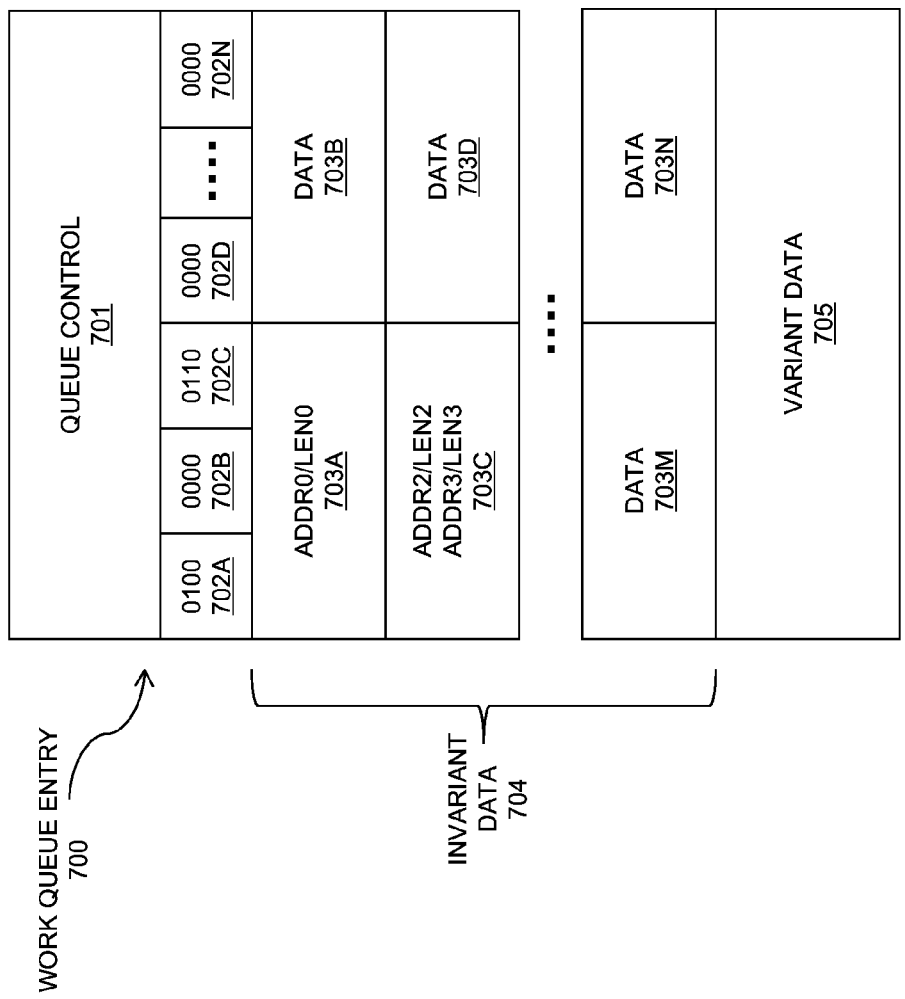
FIG. 7 depicts a block diagram of a work queue entry including an ATS field in accordance with an embodiment.

An example work queue entry 700 that is shown in FIG. 7 may be generated by the generic driver 104 based on control block 600 in a computing system that supports use of scatter gather lists for memory allocation. ATS field 702A-N in work queue entry 700 comprises "0100_000_0110_0000_0000 . . . 0" due to translation of the original addr1/len1 pointer in ATS field 603C of control block 600 into a scatter gather list comprising two entries, addr2/len2 and addr3/len3, as shown in field 703C of data fields 703A-N in invariant data 704. Work queue entry 700 further comprises queue control 701 and variant data 705.

Table 2 shows an example of a format for a child block. In the embodiment of Table 1, a child block may be indicated by an ATS field that has a value of 0010. The data field associated with such an ATS field may comprise a pointer to the child block.

TABLE 2

| ADDRESS | CONTENTS |
|---|---|
| A | ATS0 |
| A + 8 | ATS1 |
| A + 16 | ATS2 |
| A + 24 | ATS3 |
| A + 32 | DESCRIPTORS0 (8 × 12B) |
| A + 128 | DESCRIPTORS1 (8 × 16B) |
| A + 256 | DESCRIPTORS2 (8 × 16B) |
| A + 384 | DESCRIPTORS3 (8 × 16B) |
| A + 513 | — |

As will be appreciated by one skilled in the art, one or more embodiments of the present invention may be embodied as a system, method or computer program product. Accordingly, one or more embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more embodiments of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
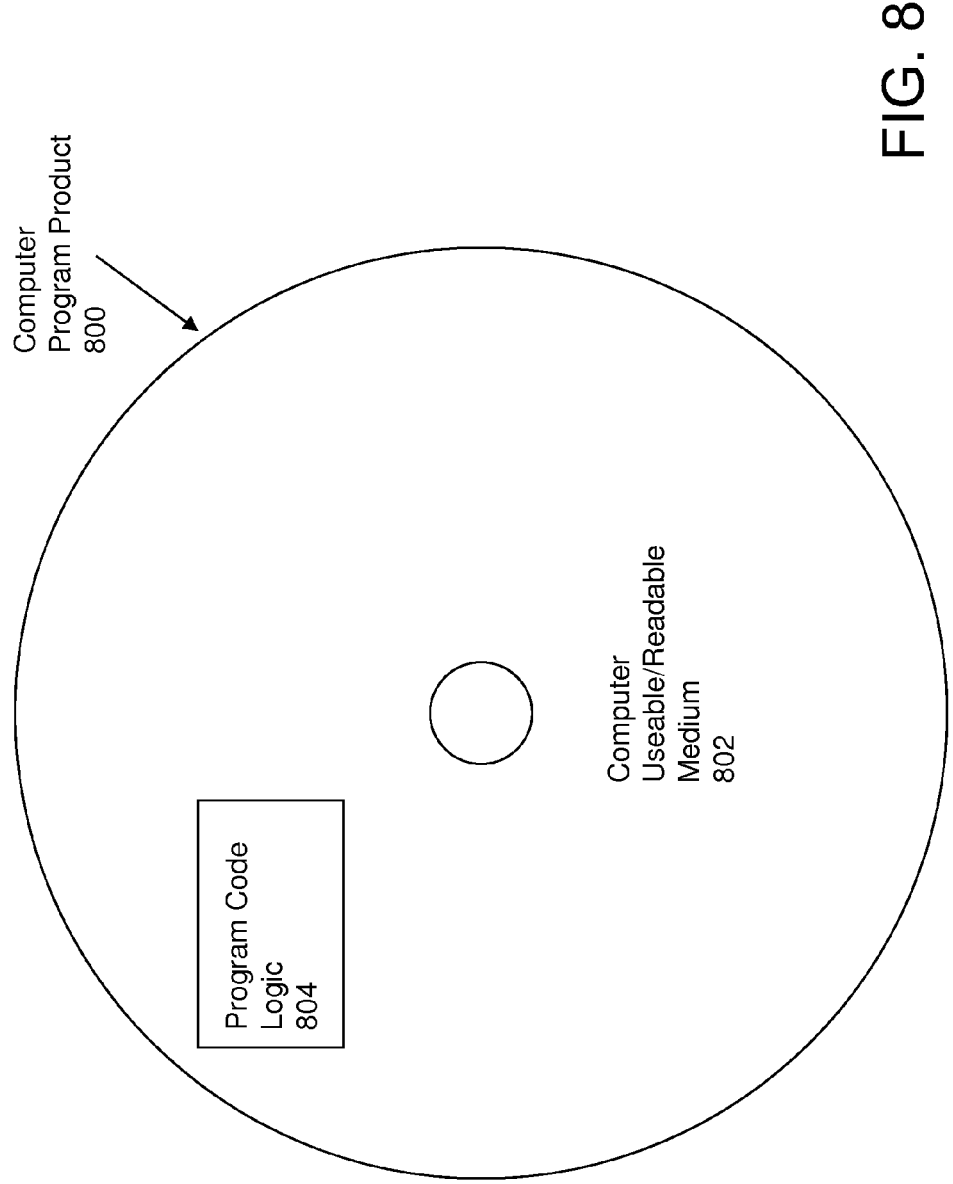
FIG. 8 illustrates a computer program product in accordance with an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of embodiments of the invention.

Technical effects and benefits include prevention of memory accesses by poorly written or malicious software.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing an address translation/specification (ATS) field for a hardware accelerator, the computer program product comprising:
    a tangible, non-transitory storage medium readable by a processing circuit and storing instructions for execution by the processing circuit for performing a method comprising:
        receiving a work queue entry from a work queue in a main memory by the hardware accelerator, the hardware accelerator communicatively coupled to a processor that is configured to execute user-space software, the hardware accelerator comprising a hardware module that is distinct from the processor, the work queue entry corresponding to an operation of the hardware accelerator that is requested by user-space software that is currently being executed by the processor that is communicatively coupled to the hardware accelerator, the work queue entry comprising a real memory address in the main memory for use in execution of the operation by the hardware accelerator, and a first ATS field that describes the real memory address in the work queue entry;
        before executing the operation corresponding to the work queue entry by the hardware accelerator, determining, by the hardware accelerator, whether the first ATS field is consistent with the operation of the hardware accelerator corresponding to the work queue entry and the real memory address in the work queue entry;
        based on determining that the first ATS field is consistent with the operation corresponding to the work queue entry and the real memory address in the work queue entry, executing the operation corresponding to the work queue entry by the hardware accelerator; and
        based on determining that the first ATS field is not consistent with the operation corresponding to the work queue entry and the real memory address in the work queue entry, rejecting the work queue entry by the hardware accelerator.

2. The computer program product of claim 1, further comprising executing, by the processor that is communicatively coupled to the hardware accelerator, a generic driver to perform a method comprising:
receiving a control block corresponding to the operation of the hardware accelerator that is requested by the user-space software that is currently being executed by the processor from an application-specific library executing on the processor, the control block comprising a second ATS field and one or more virtual addresses;
performing a memory allocation corresponding to the one or more memory areas in the main memory based on the one or more virtual addresses and the second ATS field;
generating the work queue entry corresponding to the operation based on the memory allocation, the work queue entry comprising the real memory address corresponding to the one or more memory areas and the first ATS field;
pinning the one or more memory areas in the main memory; and
storing the generated work queue entry in the work queue in the main memory.

3. The computer program product of claim 2, wherein executing the operation corresponding to the work queue entry by the hardware accelerator comprises accessing the one or more memory areas in the main memory by the hardware accelerator.

4. The computer program product of claim 2, wherein the first ATS field in the work queue entry and the second ATS field in the control block are different.

5. The computer program product of claim 4, wherein the generic driver is further configured to:
determine a memory reference in the control block, wherein the second ATS field corresponds to the memory reference;
determining whether the memory reference is suitable for an operating system (OS) that is being executed by the processor;
based on determining that the memory reference in the control block is not suitable for the OS, substituting the memory reference in the control block with an equivalent representation of the memory reference that is suitable for the OS;
performing the memory allocation based on the equivalent representation of the memory reference; and
generating the work queue entry to include the equivalent representation of the memory reference as the real memory address in the work queue entry, and the first ATS field, wherein the first ATS field corresponds to the equivalent representation of the memory reference.

6. The computer program product of claim 1, wherein the hardware accelerator comprises a field programmable gate array (FPGA) logic.

7. The computer program product of claim 1, the work queue entry comprising an invariant data portion, the invariant data portion comprising a plurality of fields; and
the first ATS field comprising a plurality of ATS subfields, and wherein each of the ATS subfields describes a respective field in the invariant data portion of the work queue entry.

8. The computer program product of claim 1, wherein the first ATS field comprises:
a field indicating that a portion of the work queue entry comprises a scatter gather list of memory addresses.

9. The computer program product of claim 1, wherein the hardware accelerator comprises a networking processor.

10. The computer program product of claim 1, wherein the hardware accelerator comprises a graphics engine.

11. The computer program product of claim 1, wherein the first ATS field comprises a field indicating that a portion of the work queue entry comprises a flat memory address.

12. The computer program product of claim 1, wherein the first ATS field comprises a field indicating that a portion of the work queue entry comprises raw data.

13. The computer program product of claim 1, wherein the first ATS field comprises a field indicating a memory access mode comprising one of read only and read/write for the operation of the hardware accelerator.

14. The computer program product of claim 1, wherein the first ATS field comprises a field indicating that a portion of the work queue entry comprises a pointer to a child work queue entry in the work queue, the child work queue entry comprising a third ATS field and at least one of data and addressees corresponding to the operation of the hardware accelerator, and wherein executing the operation corresponding to the work queue entry by the hardware accelerator comprises processing the work queue entry and the child work queue entry.

15. A method for an address translation/specification (ATS) field for a hardware accelerator, comprising:
receiving a work queue entry from a work queue in a main memory by the hardware accelerator, the hardware accelerator communicatively coupled to a processor that is configured to execute user-space software, the hardware accelerator comprising a hardware module that is distinct from the processor, the work queue entry corresponding to an operation of the hardware accelerator that is requested by user-space software that is currently being executed by the processor that is communicatively coupled to the hardware accelerator, the work queue entry comprising a real memory address in the main memory for use in execution of the operation by the hardware accelerator, and a first ATS field that describes the real memory address in the work queue entry;
before executing the operation corresponding to the work queue entry by the hardware accelerator, determining, by the hardware accelerator, whether the first ATS field is consistent with the operation of the hardware accelerator corresponding to the work queue entry and the real memory address in the work queue entry;
based on determining that the first ATS field is consistent with the operation corresponding to the work queue entry and the real memory address in the work queue entry, executing the operation corresponding to the work queue entry by the hardware accelerator; and
based on determining that the first ATS field is not consistent with the operation corresponding to the work queue entry and the real memory address in the work queue entry, rejecting the work queue entry by the hardware accelerator.

16. The method claim 15, further comprising executing, by the processor that is communicatively coupled to the hardware accelerator, a generic driver to perform a method comprising:
receiving a control block corresponding to the operation of the hardware accelerator that is requested by the user-space software that is currently being executed by the processor from an application-specific library executing on the processor, the control block comprising a second ATS field and one or more virtual addresses;
performing a memory allocation corresponding to the one or more memory areas in the main memory based on the one or more virtual addresses and the second ATS field;

generating the work queue entry corresponding to the operation based on the memory allocation, the work queue entry comprising the real memory address corresponding to the one or more memory areas and the first ATS field;

pinning the one or more memory areas in the main memory; and storing the generated work queue entry in the work queue in the main memory.

17. The system of claim 16, wherein executing the operation corresponding to the work queue entry by the hardware accelerator comprises accessing the one or more memory areas in the main memory by the hardware accelerator.

18. The method of claim 16, wherein the first ATS field in the work queue entry and the second ATS field in the control block are different.

19. The method of claim 17, wherein the hardware accelerator comprises a field programmable gate array (FPGA) logic.

20. The method of claim 17, the work queue entry comprising an invariant data portion, the invariant data portion comprising a plurality of fields; and the first ATS field comprising a plurality of ATS subfields, and wherein each of the ATS subfields describes a respective field in the invariant data portion of the work queue entry.

* * * * *